United States Patent [19]

Atlas

[11] Patent Number: 5,063,336

[45] Date of Patent: Nov. 5, 1991

[54] MECHANICAL STABILIZATION SYSTEM USING COUNTER-ROTATION AND A SINGLE MOTOR

[75] Inventor: Gérard Atlas, Saint Marcel, France

[73] Assignee: Societe Europeenne de Propulsion, Suresnes, France

[21] Appl. No.: 470,875

[22] Filed: Jan. 26, 1990

[30] Foreign Application Priority Data

Jan. 31, 1989 [FR] France .................................. 89 01218

[51] Int. Cl.$^5$ .............................................. G05B 5/01
[52] U.S. Cl. ..................................... 318/611; 244/165
[58] Field of Search ......................... 318/611; 244/165

[56] References Cited

U.S. PATENT DOCUMENTS

| | | | |
|---|---|---|---|
| 1,612,330 | 12/1926 | Trumpler | 307/51 |
| 3,435,704 | 4/1969 | Quinn | 74/572 |
| 4,573,651 | 3/1986 | Stanton | 244/165 |

FOREIGN PATENT DOCUMENTS

| | | |
|---|---|---|
| 3500716 | 7/1986 | Fed. Rep. of Germany . |
| 2329095 | 5/1977 | France . |
| 2339762 | 8/1977 | France . |
| 59-169353 | 9/1984 | Japan . |

OTHER PUBLICATIONS

"A Reactionless Precision Pointing Actuator", Peter Wiktor, Aerospace Mechanism Symp./Conference, Houston, May 1987, pp. 165–174.

*Primary Examiner*—William M. Shoop, Jr.
*Assistant Examiner*—Saul M. Bergmann
*Attorney, Agent, or Firm*—Weingarten, Schurgin, Gagnebin & Hayes

[57] ABSTRACT

The system for stabilizing a support comprises a working rotor mounted on the support by frictionless bearings and fixed to a working member for which at least one parameter associated with the rotation of the working rotor is variable as a function of time. A nested reaction rotor is mounted concentrically relative to the working rotor by frictionless bearings such as magnetic bearings or gas bearings and it supports a reaction inertia member. A single servo-controlled electric motor is interposed between the working rotor and the reaction rotor in order to drive the working rotor and the reaction rotor in opposite directions in such a manner that the torque disturbances generated on the support by the motion of the working rotor are cancelled by the simultaneous reaction motion of the reaction rotor, with the ratio of the speeds of the working rotor and the reaction rotor being such that the total angular momentum of the working rotor and of the reaction rotor is kept equal to zero.

8 Claims, 2 Drawing Sheets

MECHANICAL STABILIZATION SYSTEM USING COUNTER-ROTATION AND A SINGLE MOTOR

The present invention provides a mechanical stabilization system using counter-rotation and a single motor, the system comprising a support to be stabilized, a working rotor mounted on the support by means of bearings and fixed to a working member for which at least one parameter associated with the rotation of the working rotor is variable as a function of time, an electric motor for driving the working rotor, a detector interposed between the working rotor and the support for measuring said parameter associated with the rotation of the working rotor on which a predetermined law of motion as a function of time is imposed, and a servo-control circuit receiving signals from the detector for modifying the operating characteristics of the motor so as to cause the working rotor to comply with the said predetermined law of motion.

BACKGROUND OF THE INVENTION

Rotary systems having at least one parameter such as position, speed, torque, or acceleration which is servo-controlled as a function of time, tend to disturb the support on which they are mounted by a reaction effect. Such disturbances can generally be considered as being negligible when the support has considerable mass, e.g. a large ship. In contrast, the disturbances become significant and require compensating when the mass of the support is relatively small or when the position of the support must be maintained very accurately. This applies in particular to satellites which are required to conserve a well-defined attitude in orbit or which are subjected to the constraints of microgravity: the systems embarked on the satellite such as systems for rotating an antenna or solar panels at a non-constant speed tend to disturb the stability of the satellite unacceptably in the absence of stabilization systems.

In a paper entitled "A Reactionless Precision Pointing Actuator" given by Peter Wiktor at the "Aerospace Mechanism Symposium" held in Houston in May 1987, proposals are made to provide a control system for a gyroscopic platform which simultaneously ensures stabilization so as to prevent a reaction torque appearing on the platform support which is constituted by a spacecraft or satellite. In order to ensure decoupling between the motion of the gyroscopic platform and the attitude control of the spacecraft, counter-rotating motion is imparted to a reaction wheel incorporated in the gyroscopic platform and provided with a shaft which is coaxial with the shaft of the gyroscopic platform and which is rotated in the opposite direction thereto by means of an electric motor for the reaction wheel, having its stator mounted on the gyroscopic platform and its rotor fixed to said coaxial shaft. A direct drive second motor has its stator fixed to the support and its rotor fixed to the axis of the gyroscopic platform and serves both to drive the gyroscopic platform so as to cause it to take up an angular position or a speed of rotation as a function of a predetermined law, and also to compensate for interferring torque due to friction in the bearings or to the presence of electricity power cables which prevent angular rotations through more than $2\pi$ radians. The servo-control circuit associated with the electric motor for the reaction wheel has a passband situated in a higher range of frequencies than the passband of the servo-control circuits associated with the direct drive motor.

The embodiment described in the above-mentioned paper uses two electric motors of non-negligible power, thereby increasing both mass and energy consumption, and in addition it is not suitable for applications in which the working rotary member is required to rotate through several turns.

SUMMARY OF THE INVENTION

The present invention seeks to remedy the above-mentioned drawbacks and provide a mechanical stabilization system which is more convenient to implement, more accurate, more compact, and which enables the range of possible applications to be widened.

These aims are achieved by a mechanical stabilization system using counter-rotation and a single motor, the system comprising a support to be stabilized, a working rotor mounted on the support by means of bearings and fixed to a working member for which at least one parameter associated with the rotation of the working rotor is variable as a function of time, an electric motor for driving the working rotor, a detector interposed between the working rotor and the support for measuring said parameter associated with the rotation of the working rotor on which a predetermined law of motion as a function of time is imposed, and a servo-control circuit receiving signals from the detector for modifying the operating characteristics of the motor so as to cause the working rotor to comply with the said predetermined law of motion, wherein the bearings supporting the working rotor are frictionless bearings such as magnetic bearings or gas bearings, wherein the system also includes a nested reaction rotor which is mounted concentrically with the working rotor by means of frictionless bearings such as magnetic bearings or gas bearings, and supporting a reaction inertia member, and wherein the motor is interposed between the working rotor and the reaction rotor to rotate the working rotor and the reaction rotor in opposite directions in such a manner that the torque disturbances generated on the support by the motion of the working rotor are cancelled by the simultaneous reaction motion of the reaction motor, with the ratio of the speeds of the working rotor and the reaction rotor being such that the total angular momentum of the working rotor and the reaction rotor is kept equal to zero.

Thus, according to the present invention, it is possible to maintain zero total angular momentum for the system while using only one electric motor, thereby reducing the total mass of the system.

In a particular aspect of the present invention, the motor has winding-free pole pieces fixed to the working rotor and wound pole pieces fixed to the reaction rotor. The reaction inertia member fixed to the reaction rotor is preferably constituted by working elements performing technical functions, e.g. the power supply and servo-control circuits for the windings of the wound pole pieces of the motor.

Advantageously, the bearings supporting the working rotor are constituted by active magnetic bearings whose electromagnets and associated detectors are mounted on the support facing an outside face of the working rotor, and the bearings supporting the reaction rotor relative to the working rotor are constituted by active magnetic bearings whose electromagnets and associated detectors are mounted on the reaction rotor facing an inside face of the working rotor.

The control circuits for the active magnetic bearings supporting the reaction rotor may be disposed in the reaction inertia member fixed to the reaction rotor in order to constitute at least a portion of the reaction inertia enabling the total angular momentum of the working rotor and of the reaction rotor to be cancelled.

The invention may be applied to various rotary assemblies on support structures on land, at sea, in the air, underwater, and in space, either with or without gravity forces being present.

In a particularly advantageous application, the support is constituted by a satellite or a space station, and the working member mounted on the working rotor is constituted by a rotary member such as an antenna or a solar panel.

BRIEF DESCRIPTION OF THE DRAWINGS

Embodiments of the invention are described by way of example with reference to the accompanying drawings, in which.

DETAILED DESCRIPTION

Figure 1:
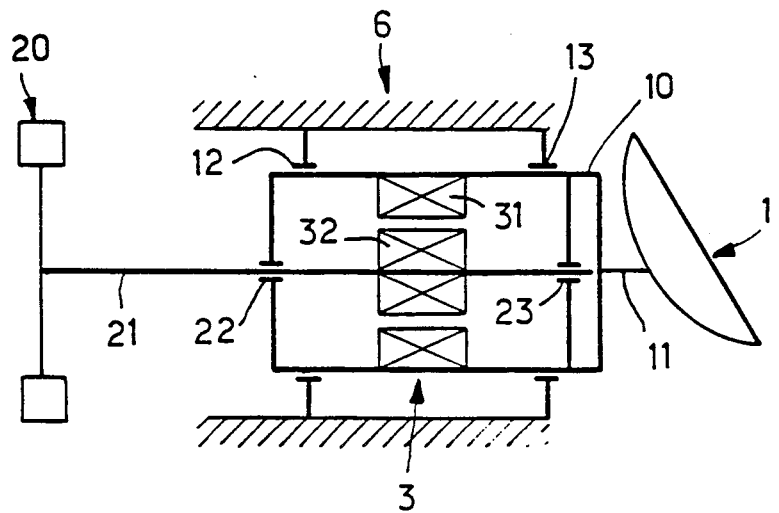
FIG. 1 is a diagram of a first embodiment of a mechanical stabilization system using counter-rotation of nested rotors together with a single electric motor acting on the rotors, the system including frictionless bearings and the motor being disposed between the bearings.
Figure 2:
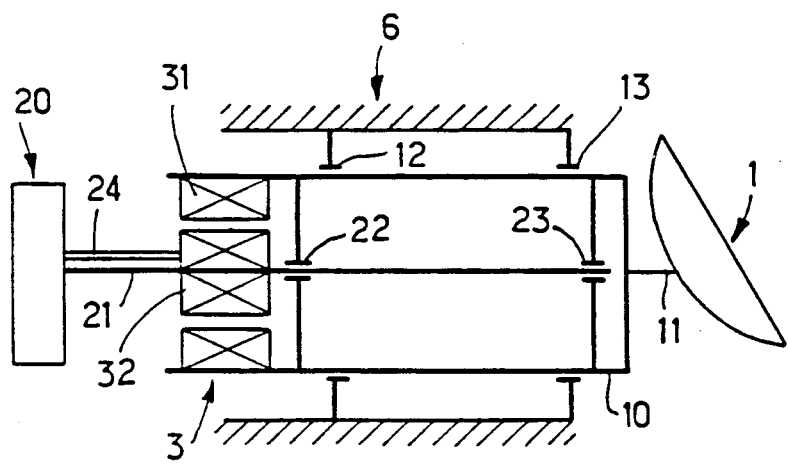
FIG. 2 is a view similar to FIG. 1 showing a variant embodiment in which the single electric motor is cantilevered on the rotors relative to the bearings.

FIGS. 1 and 2 are diagrams of a rotary assembly comprising a working rotor 10 having a shaft 11 extending the working rotor 10 axially and attached to a working member 1 such as an antenna, for example, with the angular position of the working member, or some other parameter related to rotation of the working rotor 10, e.g. torque, acceleration, or speed, needs to be adjusted permanently in compliance with a predetermined law and without transmitting disturbances to a support 6 on which the working rotor 10 is mounted, e.g. via the shaft 11 and frictionless bearings 12 and 13 such as gas bearings or magnetic bearings.

In order to control the motion of the working rotor 10 without disturbing the support 6, which may be constituted by a satellite of relatively low mass, for example, a reaction rotor 21 connected to a reaction inertia member 20 is mounted on the working rotor 10 by means of bearings 22 and 23 which are likewise frictionless bearings such as gas bearings or magnetic bearings, and the motion of the reaction rotor is actively controlled in the opposite direction of the working rotor 10 and with a magnitude such that the support 6 is not subjected to disturbance generated by the various moving members, i.e. the overall variations in angular momentum as sensed by the support are zero.

In accordance with the present invention, a single servo-controlled electric motor 3 under the control of electronic circuits (not shown in the figure) is interposed between the working rotor 10 and the reaction rotor 21 and contributes both to imparting rotary motion to the working rotor 10 and the working member 1 under the control of time-varying predetermined variable motion parameters, and to driving the reaction rotor 21 and consequently the reaction member 20 in the opposite direction, with the working rotor 10 and the reaction rotor 21 being driven in opposite directions relative to the support at speeds whose ratio is such that the magnitude of the angle of momentum acquired by each of the rotors 10 and 21 in the absence of friction is equal to that of the other rotor so that the total angular momentum remains zero.

A detector 33 (not shown in FIG. 3) is interposed between the working rotor 10 and the support 6. This detector measures a parameter (e.g. speed, or torque, or acceleration) associated with the motion of the working rotor 10 and which is to be caused to comply to a predetermined law as a function of time. The value of this parameter as measured by the detector 33 is transmitted to the servo-control circuits which modify the appropriate operating characteristics of the motor 3 so as to ensure that the working rotor 10 does indeed comply with the predetermined law of motion. Whatever this law may be, the rotation of the reaction rotor 21 prevents disturbances being transmitted to the support 6.

When necessary, and depending on the type of servo-control used, a differential detector 34 (shown in FIG. 3) may be interposed between the working rotor 10 and the reaction rotor 21 for permanently monitoring the relative motion of these two concentric rotors 10 and 21 which are nested in each other.

The single motor 3 may be powered by a rotary transformer or by rotary current collectors (FIG. 3) with the rotary transformer 7 not giving rise to reaction torque on the rotary assembly.

If the motor is powered in this way, then the maximum positive and negative angles through which the working rotor 10 and the reaction rotor 21 can rotate are practically unlimited and may constitute a large number of rotations.

This makes it possible, for example, to take account of cases where the working rotor 10 reaches large amplitudes on either side of a zero mean value, or reaches arbitrary amplitudes on either side of a non-zero mean value, with these amplitudes being a function of the mission to be performed by the useful inertia of the useful member 1 fixed to the useful rotor 10.

Figure 3:
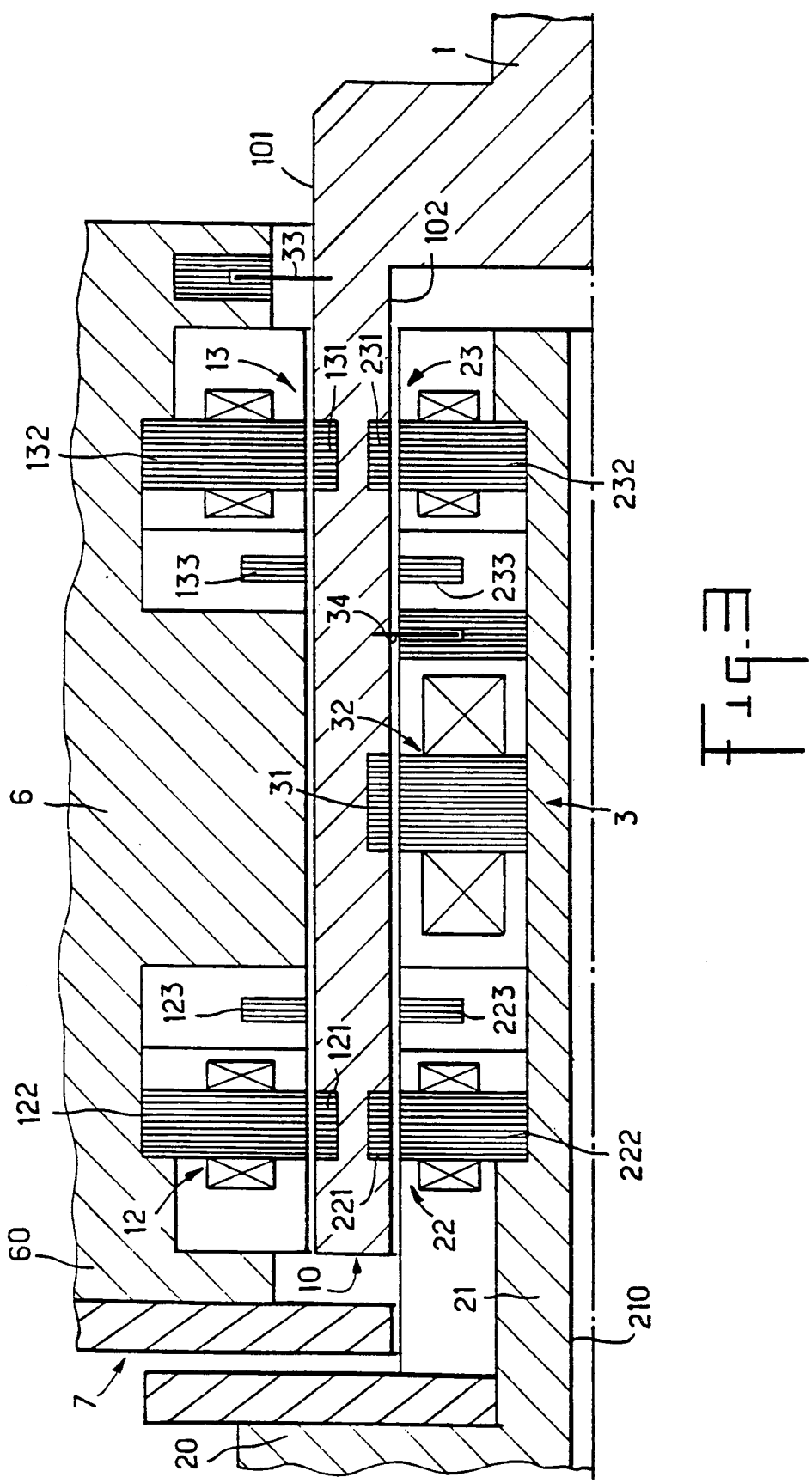
FIG. 3 is an axial half-section through a particular example of a stabilization system as shown in FIG. 1 having concentric nested rotors and an electric motor whose wound pole pieces are fixed to the reaction rotor, with the rotors being mounted by means of active magnetic bearings.

The embodiments shown in FIGS. 1 to 3 are also applicable to cases where the working rotor 10 presents low amplitudes about a zero mean value with the moment of inertia JA of the reaction rotor 21 being substantially less than the moment of inertia JU of the working rotor 10 so that the reaction rotor 21 has to rotate through large amplitudes which may reach a large number of rotations.

In variant embodiments, the windings of the main motor 3 which may be fixed to the working rotor 10 or to the reaction rotor 21 (FIGS. 2 and 3) are powered via a spiral-wound coil of wires enabling the corresponding rotor (working rotor 10 or reaction rotor 21 in FIGS. 2 and 3) to rotate through several rotations.

In a particular example, the amplitude of the angular motion of the working rotor 10 is limited and lies between the values $-\theta U$ and $+\theta U$, which values may nevertheless be equal to several rotations. In this case, the drive motor 3 common to the working rotor 10 and to the reaction rotor 21 includes winding-free pole pieces 32 fixed to the reaction rotor 21 and wound pole pieces 31 fixed to the working rotor 10. The windings of the wound pole pieces 31 are powered by a spiralwound coil of wires enabling the working rotor 10 to rotate without restriction of amplitude within a range of values lying between $-\theta U$ and $+\theta U$.

The invention also takes account of cases where the mean speed of rotation of the working rotor 10 is zero, and the amplitude of rotation of the working rotor 10 is limited in value about a mean position, but may be equal to several rotations. In this case, the rotation of the reaction rotor 21 is also determined to remain between values $-\theta A$ and $+\theta A$ which may be equal to several rotations. These limit values $-\theta A$ and $+\theta A$ are determined by giving the reaction rotor 21 an appropriate moment of inertia JA which takes account of the maximum amplitude of rotation of the working rotor, the moment of inertia of the working rotor 10, and the predetermined law of motion to be imposed on said working rotor 10. In this case, the drive motor 3 common to the working rotor 10 and the reaction rotor 21 has winding-free pole pieces 31 fixed to the working rotor 10 and wound pole pieces 32 fixed to the reaction rotor 21, as shown in FIGS. 1 and 2. The windings in the pole pieces 32 are powered by a spiral-wound coil of wires enabling the reaction rotor 21 at any instant to take up any amplitude without restriction lying within the range of values $-\theta A$ to $+\theta A$.

In the various embodiments described, the mass of the member 20 constituting the reaction inertia is preferably constituted by working elements performing technical functions, with said working elements being the servo-control circuits for the main motor 3, for example, and being connected thereto via connection wires 24.

The stabilization system of the invention may have various different configurations. Thus, the main motor 3 may be mounted on portions of the working rotor 10 and of the reaction rotor 21 which are cantilevered relative to respective sets of bearings 12 & 13 and 22 & 23 (FIG. 2), or else they may be disposed on the rotors 10 and 21 centrally between the respective sets of bearings 12 & 13 and 22 & 23 (FIGS. 1 and 3). The motor 3 could be mounted, for example, so as to be cantilevered on the reaction rotor 21 relative to the bearings 22 and 23 while being situated between the bearings 12 and 13 of the working rotor 10.

The embodiment shown in FIG. 3 has a working rotor 10 and a reaction rotor 21 which are concentric with each other and relative to a cylindrically shaped portion 60 of the support, thereby defining a compact structure enabling the bearings 22 and 23 supporting the reaction rotor 21 relative to the working rotor 10 to be disposed in the same radial planes as contain the bearings 12 and 13 which support the working rotor 10 relative to the base support structure 6.

In the embodiment shown in FIG. 3 the single motor 3 is mounted in the central portion of the concentric portions of the rotors 10 and 21 situated between the bearings 12, 22 and 13, 23, with an associated detector 34 detecting the relative positions of the rotors 10 and 21. The detector 34 and the detector 33 for detecting the position of the rotor 10 relative to the support 6 could nevertheless be disposed in different locations other than those shown in the drawing.

In the embodiment of FIG. 3, the frictionless bearings 12, 13, 22, and 23 are constituted by active magnetic bearings comprising sets of electromagnets 122, 132, 222, and 232 disposed facing rotary armatures 121, 131, 221, and 231. The windings of the electromagnets are powered by servo-control circuits under the control of position detectors 123, 133, 223, and 233 disposed close to respective ones of the magnetic bearings 12, 13, 22, and 23.

As shown in FIG. 3, the electromagnets 122 and 132 of the magnetic bearings 12 and 13, together with their associated detectors 123, 133 are mounted on the support 6 facing an outside face 101 of the working rotor 10, whereas the electromagnets 222 and 232 of the magnetic bearings 22 and 23, together with the associated detectors 223 and 233 are mounted on the reaction rotor 21 facing an inside face 102 of the working rotor 10.

This disposition makes it possible to place the circuits for controlling the magnetic bearings 12 and 13 on the support 6 using static connections, and the circuits for controlling the magnetic bearings 22 and 23 in the reaction inertia member 20 which is fixed to the reaction rotor 21. These circuits thus contribute to constituting a portion of the reaction inertia which is used for cancelling the total angular momentum of the working rotor 10 and the reaction rotor 21.

I claim:

1. A mechanical stabilization system using counter-rotation and a single motor, the system comprising:
   a support to be stabilized,
   a working rotor mounted on the support by frictionless bearings and fixed to a working member for which at least one parameter associated with the rotation of the working rotor is variable as a function of time,
   an electric motor for driving the working rotor,
   a detector interposed between the working rotor and the support for measuring the parameter associated with the rotation of the working rotor on which a predetermined law of motion as a function of time is imposed,
   a servo-control circuit receiving signals from the detector for modifying the operating characteristics of the motor so as to cause the working rotor to comply with the predetermined law of motion; and
   a nested reaction rotor mounted concentrically with the working rotor by frictionless bearings, and supporting a reaction inertia member,
   wherein the motor is interposed between the working rotor and the reaction rotor to rotate the working rotor and the reaction rotor in opposite directions such that the torque disturbances generated on the support by the motion of the working rotor are cancelled by the simultaneous reaction motion of the reaction motor, with the ratio of the speeds of the working rotor and the reaction rotor being such that the total angular momentum of the working rotor and the reaction rotor is maintained at zero.

2. The system of claim 1, wherein the motor comprises winding-free pole piece fixed to the working rotor and wound pole pieces fixed to the reaction rotor.

3. The system of claim 2, wherein the reaction inertia member fixed to the reaction rotor is constituted by working elements performing technical functions.

4. The system of claim 1, wherein the bearings supporting the working rotor are active magnetic bearings comprising electromagnets and associated detectors mounted on the support facing an outside face of the working rotor, and wherein the bearings supporting the reaction rotor relative to the working rotor are active magnetic bearings comprising electromagnets and associated detectors mounted on the reaction rotor facing an inside face of the working rotor.

5. The system of claim 4, wherein the control circuits for the active magnetic bearings supporting the reaction rotor are disposed in the reaction inertia member fixed to the reaction rotor and constitute at least a portion of the reaction inertia enabling the total angular momentum of the working rotor and of the reaction rotor to be cancelled.

6. The system of claim 1, wherein the support is a spacecraft, and the working member mounted on the working rotor is constituted by a rotary member.

7. The system of claim 3, wherein said working elements performing technical functions comprise power supply and servo-control circuits for windings of the wound pole pieces of the motor.

8. The system of claim 6, wherein said rotary member is an antenna.

* * * * *